June 15, 1926.
E. E. COTHRAN
1,588,706
SOUND RECORDING AND REPRODUCING DEVICE
Filed Nov. 23, 1922  3 Sheets-Sheet 1
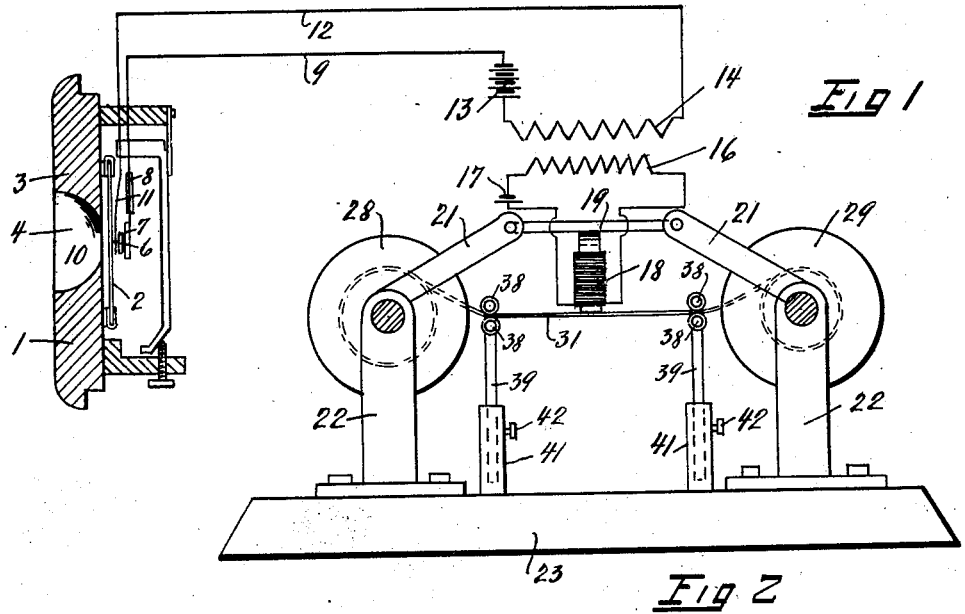
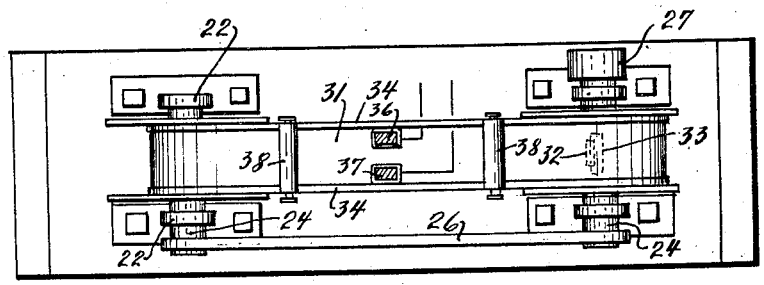
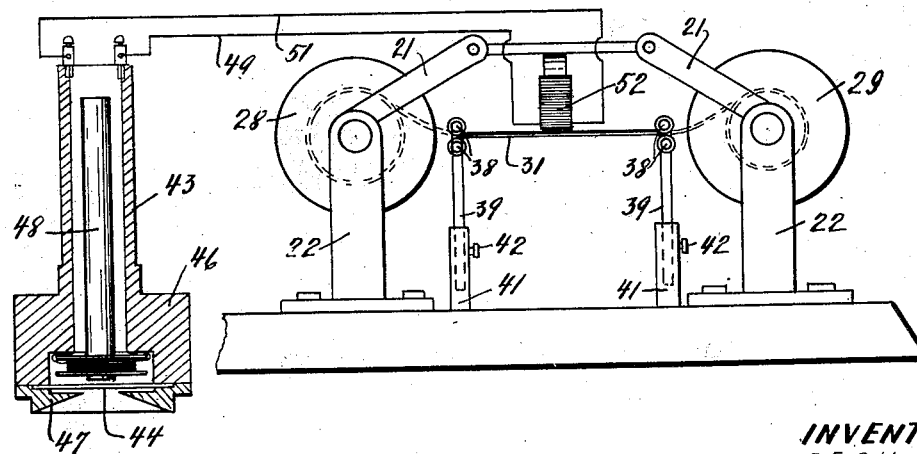
INVENTOR
E. E. Cothran

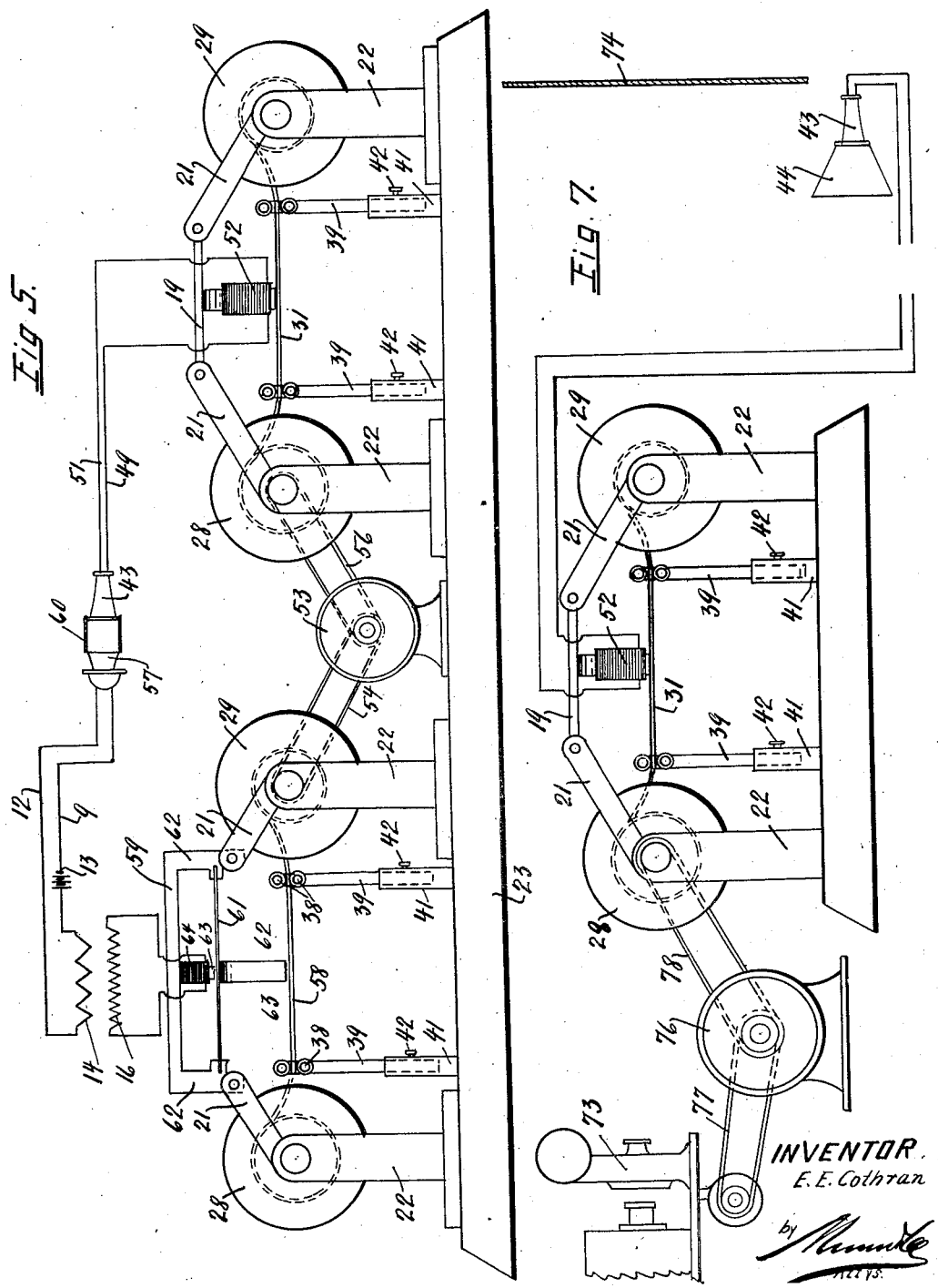

June 15, 1926.
E. E. COTHRAN
1,588,706
SOUND RECORDING AND REPRODUCING DEVICE
Filed Nov. 23, 1922   3 Sheets-Sheet 3
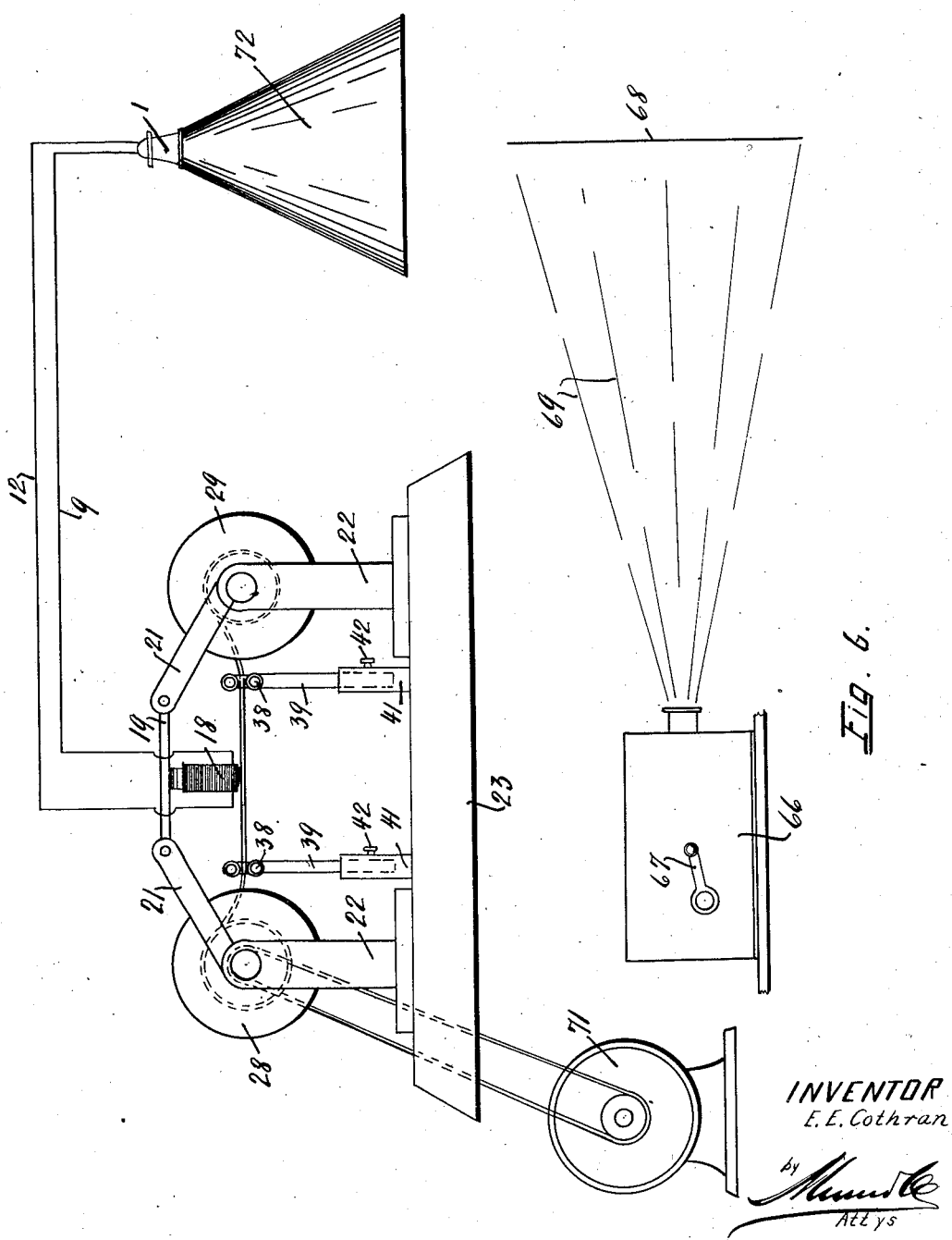
INVENTOR
E. E. Cothran Patented June 15, 1926.

1,588,706

UNITED STATES PATENT OFFICE.

EDWARD EVERETT COTHRAN, OF WRIGHT, CALIFORNIA.

SOUND RECORDING AND REPRODUCING DEVICE.

Application filed November 23, 1922. Serial No. 602,894.

The present invention relates to improvements in sound recording and reproducing devices, and has particular reference to a device adapted to be used in connection with motion pictures, the particular object of the invention being to provide a device by means of which speeches, songs, or other sounds made by the actors or otherwise while a motion picture is being produced may be recorded in synchronism with the taking of the pictures by the camera. A further object of the invention is to provide means by which the sounds thus recorded may be reproduced while the picture is projected on the screen in exact synchronism with the picture, so that pictures and sounds represent a faithful reproduction of the original play. A further object of the invention is to provide means by which the records obtained during the production of the motion picture films may be multiplied in unlimited numbers with the same facility as motion picture films are multiplied. Further objects and advantages of the device will appear as the specification proceeds.

The preferred form of my invention is illustrated in the accompanying drawings in which Figure 1 represents a partly diagrammatic illustration of my device for recording sounds in synchronism with the taking of motion pictures in side elevation; Figure 2 a top plan view, partly in section, of the principal operating part of the device shown in Figure 1; Figure 3 a detail view showing the cooperation of an electro-magnet and a steel tape; Figure 4 a side elevation partly in section of a sound reproducing device; Figure 5 a side elevation partly in section of a device for multiplying the records;
Figure 6 an illustration of the manner in which the sounds may be recorded in synchronism with the taking of motion pictures; and Figure 7, a partly diagrammatic illustration of the manner in which the sounds may be reproduced in synchronism with the projection of motion pictures. While I have shown only the preferred form of the invention it should be understood that various changes or modifications may be made within the scope of the claims hereto attached without departing from the spirit of the invention.

Referring first to the sound recording device illustrated in Figures 1, 2 and 3, it will be seen that I use as part of my recording device a well known type of a telephone transmitter (1). The same comprises in its essential parts a diaphragm (2) supported in operative proximity to a mouth piece (3) so as to be set into vibratory motion when sounds pass through the opening (4) in the mouth piece. A carbon block (6) secured to a brass block (7) is supported rearwardly of the diaphragm in operative proximity to the same by means of a spring (8) which latter connects with the wire (9). Between the diaphragm and the carbon block is provided a platinum contact piece (10) held by a steel spring (11) which latter connects with the wire (12). The two wires (9) and (12) form a closed circuit including a battery (13) and the primary (14) of an induction coil.

The secondary (16) of the induction coil forms part of a closed circuit including a battery (17) and an electro-magnet (18). The latter is supported on a transverse member (19) secured between two arms (21) forming integral parts of two pairs of standards (22) rising in spaced and parallel relation from the base (23). In each pair of standards is mounted a horizontal shaft (24) and the two shafts are operatively connected with one another by means of a belt (26) engaging hard rubber pulleys mounted on the respective shafts. Rotary motion is imparted to one of the shafts by any suitable means as by a motor engaging the pulley (27). Two reels (28) and (29) are fixed to the two shafts (24) so as to rotate with the same, and a tape (31) preferably made of hard, thin steel highly retentive of magnetism, is secured with its ends to the two reels and adapted to be wound from one reel onto the other when the shafts (24) are rotated. The ends of the tape are preferably fastened to the reels by means of springs (32) extending through slots (33) in the tape, and the tape is provided with marginal ridges (34) for purposes described hereinafter. The various members supporting the electromagnet (18) and the steel tape (31) are positioned and dimensioned in such a manner that the steel tape passes in close proximity to the pole pieces (36) and (37) of the electro-magnet, with the latter disposed transversely to the tape so that the latter passes through the field of the electromagnet. To regulate the exact position of the operative portion of the tape (31) relative to the electro-magnet, I provide rollers (38) on opposite sides of the electro-magnet by means of which the tape is guided, the rollers being adjustably supported on posts (39) slidably engaging sockets (41) and held in position by means of set screws (42).

The device thus far described works as follows: The diaphragm of the telephone transmitter is set into vibratory motion by the sounds and the vibrating diaphragm affects the resistance of a carbon platinum contact in a manner well known in the art so as to cause a pulsating current to flow in the windings of the primary (14). A current of the same characteristics is induced in the secondary and magnetizes the electro-magnet (18) in impulses corresponding with the sound vibrations of the diaphragm. The tape (31) passing through the field of the electro-magnet is magnetized in corresponding impulses, and being made of hard steel, highly retentive of magnetism, retains the magnetism so as to constitute a permanent record of the sound waves impinging on the diaphragm. The raised edges or marginal ridges on the tape prevent contacting friction from injuring the records.

To reproduce the sounds thus recorded electro-magnetically on the tape a device of similar construction may be used as shown in Figure 4 with the only difference that the process is reversed and a telephone receiver (43) is substituted for the transmitter (1). The latter may be of any suitable type and is shown in the drawing as comprising a diaphragm (44) mounted in a frame (46) in operative proximity to the ear piece (47) with an electro-magnet (48) mounted behind the diaphragm, and electrically connected by means of wires (49) and (51) to the electro-magnet (52) of the sound reproducing device. The latter is supported over the tape (31), which in this case represents the magnetized record in the same manner as shown in Figure 1. The steel tape passing the pole pieces of the electro-magnet (52) induces a variable current in its windings, the impulses of the current corresponding to the impulses in which the record tape (31) was originally magnetized. The current passes through the windings of the electromagnet (48) and causes the diaphragm (44) to vibrate in synchronism with the electric impulses so that the diaphragm (44) vibrates in exactly the same manner as the diaphragm (2) set into vibratory motion by the original sound waves.

To make my method of recording and reproducing sounds in synchronism with the taking and projection of motion pictures practicable, it is necessary to provide means for multiplying the record. Such means is shown in Figure 5 in which the sound reproducing device of Figure 4 is shown as mounted in operative proximity with a sound recording device. The two devices are driven in synchronism by means of a single motor (53) through the belts (54) and (56). The magnetized record (31) to be multiplied is wound on one of the reels of the sound reproducing device and the receiver (43) is connected with the transmitter (57) of the sound recording device in such a manner that the respective diaphragms of the receiver and transmitter confront one another so that the receiver speaks into the transmitter. A hard rubber tube (60) is used to enclose the space between the two diaphragms. The sound recording device is provided with a steel tape (58) of the same characteristics as the steel tape previously described but unmagnetized. This recording device may be constructed in substantially the same manner as the recording device shown in Figure 1, but for the purpose of amplifying the strength of the magnetic impulses impressed upon the tape (58) I prefer to construct the device somewhat differently. A yoke (59) is rigidly supported on the two arms (21) of the frame and has a diaphragm (61) supported between the free ends of its arms (62) in operative proximity to the pole pieces (63) of the electro-magnet (64) which latter is rigidly secured to the base of the yoke (59). The diaphragm (61) supports on its central portion a permanent magnet (62) and the tape (58) is guided past its pole pieces (63) in the manner previously described.

The operation of the record multiplying device should be readily understood from the foregoing description. A pulsating current is induced in the electro-magnet (52) of the sound reproducing device by the passing of the magnetized tape underneath its pole pieces and the diaphragm of the receiver (43) vibrates correspondingly. The vibrations of this diaphragm are transmitted to the diaphragm of the transmitter (57) and are changed into electric impulses in the windings of the electro-magnet disposed in the transmitter and the primary (14) of the induction coil. Impulses of the same character are induced in the secondary (16) of the induction coil and pass through the windings of the electro-magnet (64) causing the diaphragm (61) to vibrate in the same manner as the diaphragm of a receiver. The permanent magnet (62) attached to the center of the diaphragm partakes of its vibrations whereby the distance between the pole pieces (63) of the permanent magnet and the tape (58) is changed continuously in a manner corresponding to the change in the current in the windings of the electro-magnet (64). The magnetic impulses received by the tape (58) in passing the pole pieces vary according to the distance of the tape from the pole pieces and an invisible record of magnetic character is imprinted upon the tape (58) which corresponds in every respect to the characteristics of the original record.

Figures 6 and 7 illustrate applications of my device in combination with the taking and projecting of motion pictures. In Figure 6 is shown a camera (66) adapted to be manipulated by means of a handle (67). The stage is represented by the vertical line (68) and the range of the camera by the broken line (69). The recording device may be disposed at any suitable distance from the stage and from the camera, and is preferably actuated by means of a motor (71). The telephone transmitter (1) is supported at any suitable place without the range of the camera so as not to interfere with the taking of the pictures and is preferably provided with an amplifying horn (72) opening on the stage. The two devices are operated simultaneously during scenes in which sounds are to be recorded. If there are any scenes in which there are no speeches or songs or the like the sound recording device may remain inactive.

The arrangement shown in Figure 7 illustrates the method for using my sound reproducing device in connection with a motion picture projecting machine (73), the screen being represented by the vertical member (74) in the drawing. The sound reproducing device and the projector (73) are preferably driven in synchronism by one motor (76) through the belts (77) and (78). The receiver (43) preferably provided with an amplifying horn (44) may be placed underneath the screen (74) or in any other suitable position where it does not interfere with the proper projection of the motion pictures.

To transport the magnetic records it would be advisable to enclose the same in iron boxes so as to shield them from magnetic influences.

I claim:

1. Means for producing a magnetic sound record to synchronize with the action portrayed upon a film of motion pictures comprising an electro-magnet, two standards and a bridging member between the same supporting the said magnet with the pole pieces pointing downwardly, two reels supported in the standards in operative proximity to the electro-magnet having a steel tape wound thereon, means for rotating said reels whereby the tape is fed from one reel to the other, guide means engaging the steel tape on opposite sides of the electro-magnet for guiding the tape past the pole pieces transversely to the field of the electromagnet, and means for energizing the electro-magnet in accordance with sound vibrations.

2. Means for multiplying magnetic sound records comprising a steel tape magnetized in impulses corresponding to sound vibrations, an electromagnet, a telephone receiver operatively connected therewith, two reels for winding and unwinding said tape, means for guiding the tape transversely past the poles of the electromagnet, a second unmagnetized steel tape, a second electromagnet, a telephone transmitter inductively associated with the latter, a short, hollow tube connecting the diaphragms of the receiver and the transmitter, a diaphragm stretched across the field of the second electromagnet having a permanent magnet suspended therefrom, two reels for winding and unwinding said second steel tape transversely past the poles of the permanent magnet, and an electric motor for driving the reels and tapes in synchronous motion, substantially as described.

3. A sound recording device comprising an electro-magnet, two standards and a bridging member between the same supporting the said magnet with the pole pieces pointing downwardly, two reels supported in the standards in operative proximity to the electro-magnet having a steel tape wound thereon, means for rotating said reels whereby the tape is fed from one reel to the other, guide means engaging the steel tape on opposite sides of the electro-magnet for guiding the tape past the pole pieces transversely to the field of the electro-magnet, and means for energizing the electro-magnet in accordance with sound vibrations.

4. A sound recording device comprising an electro-magnet, two standards and a bridging member between the same supporting the said magnet with the pole pieces pointing downwardly, two reels supported in the standards in operative proximity to the electro-magnet having a steel tape wound thereon, means for rotating said reels whereby the tape is fed from one reel to the other, guide means engaging the steel tape on opposite sides of the electro-magnet for guiding the tape past the pole pieces transversely to the field of the electro-magnet, and means for energizing the electro-magnet in accordance with sound vibrations, the guide means being vertically adjustable for controlling the distance between the tape and the pole pieces.

5. A magnetic record of the character described comprising a steel tape having marginal ridges thereon.

EDWARD EVERETT COTHRAN.